United States Patent
Chaumeau et al.

(10) Patent No.: US 7,365,631 B2
(45) Date of Patent: Apr. 29, 2008

(54) OVERHEAT DETECTION SENSOR

(75) Inventors: Hervé Chaumeau, Bourges (FR); Bruno Lhuillier, Les Bordes (FR)

(73) Assignees: Auxitrol S.A. (FR); Siemens SAS (FR)

( * ) Notice: Subject to any disclaimer, the term of this patent is extended or adjusted under 35 U.S.C. 154(b) by 176 days.

(21) Appl. No.: 10/548,209

(22) PCT Filed: Mar. 3, 2004

(86) PCT No.: PCT/FR2004/000494

§ 371 (c)(1),
(2), (4) Date: Oct. 20, 2005

(87) PCT Pub. No.: WO2004/081504

PCT Pub. Date: Sep. 23, 2004

(65) Prior Publication Data
US 2006/0146911 A1    Jul. 6, 2006

(30) Foreign Application Priority Data
Mar. 3, 2003    (FR) ................... 03 02583

(51) Int. Cl.
*H01C 7/10*    (2006.01)
(52) U.S. Cl. ..................... 338/22 R; 338/26

(58) Field of Classification Search ............... 338/22 R
See application file for complete search history.

(56) References Cited

U.S. PATENT DOCUMENTS

| | | | | |
|---|---|---|---|---|
| 2,764,659 | A | * | 9/1956 | Postal ......................... 338/26 |
| 4,453,835 | A | * | 6/1984 | Clawson et al. ............. 374/185 |
| 5,026,001 | A | * | 6/1991 | Wright et al. ................ 244/1 R |
| 5,136,278 | A | | 8/1992 | Watson et al. |
| 5,161,894 | A | | 11/1992 | Bourigault |

FOREIGN PATENT DOCUMENTS

GB    2 276 944 A    10/1994

* cited by examiner

*Primary Examiner*—Elvin Enad
*Assistant Examiner*—Joselito Baisa
(74) *Attorney, Agent, or Firm*—Lerner, David, Littenberg, Krumholz & Mentlik, LLP

(57) ABSTRACT

The invention relates to an overheat detection sensor. The inventive sensor is characterised in that it comprises a conductive core which extends inside a first conductive sheath, said core and first sheath being separated by a material having a positive or negative temperature coefficient The detector also comprises a wire which is made from a material having a positive or negative temperature coefficient. Said wire extends around the first sheath and is separated from same by means of an insulating material. The central core, the first sheath and the wire are all connected to connection means.

11 Claims, 3 Drawing Sheets

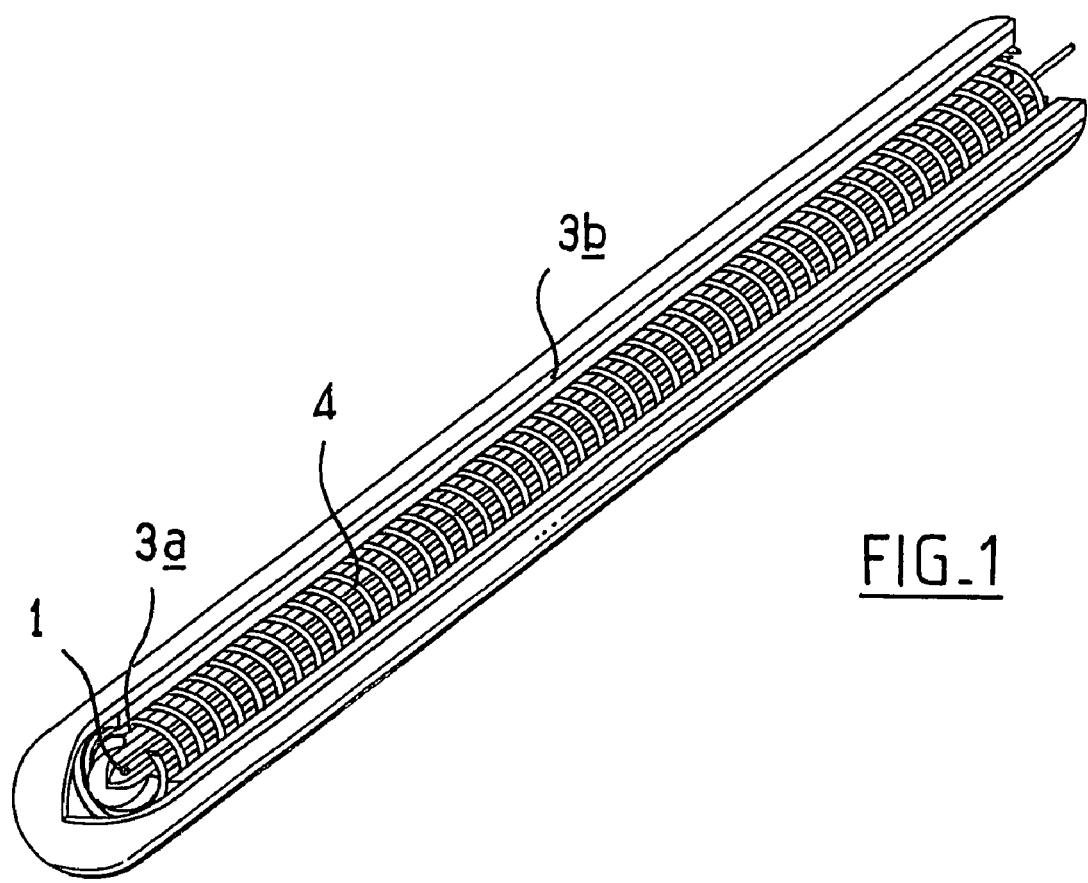
FIG_1
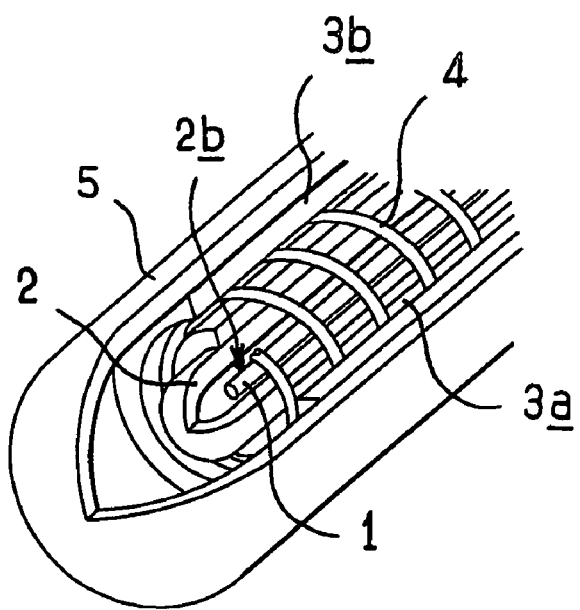
FIG_2

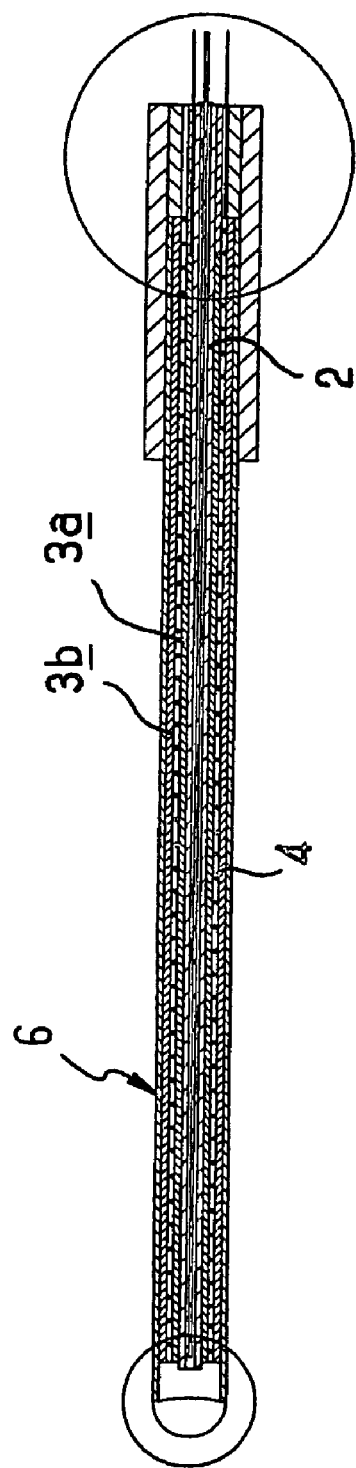
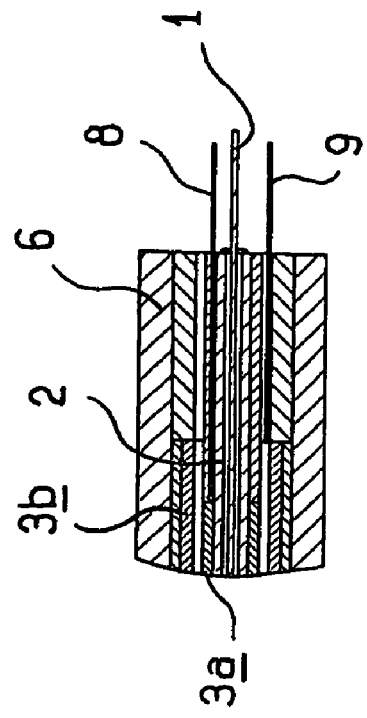
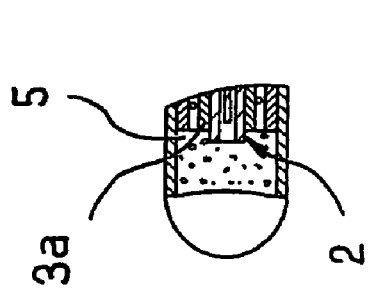

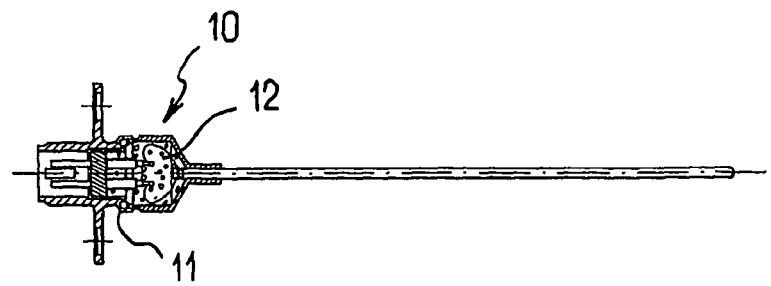
FIG_5
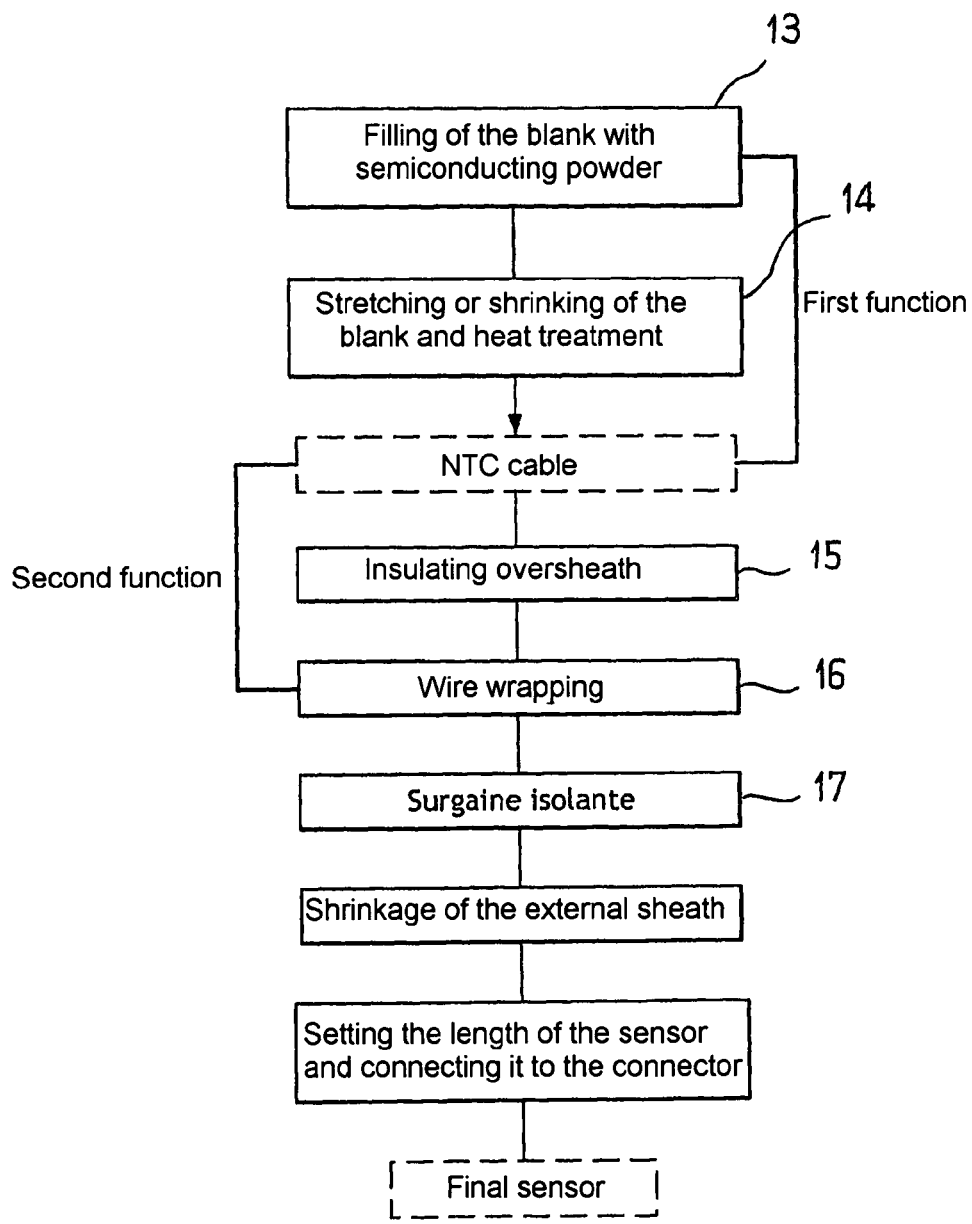
FIG_6

OVERHEAT DETECTION SENSOR

The invention relates to an overheat detection sensor.

Such a sensor is notably intended to be used for detecting possible risks of fire in the area where it is implemented.

Advantageously, in particular, it finds application in detecting overheating in motor areas (aircraft, ship, helicopter, submarine, space shuttle, industrial plants) and more generally in any sensitive area (holds, gear boxes, etc. . . . ).

Overheat detectors of the pneumatic type are known traditionally.

Such a detector uses a gas which, when it expands under the effect of overheating, will switch an electrical contact, with which a threshold crossing by the average temperature of said detector may be exhibited. Advantageously, in this respect, reference may be made to U.S. Pat. No. 5,136,278.

Also means of the metal oxide type for example, are generally provided, which are distributed throughout the length of the detector and as for them they allow temperature threshold crossings to be exhibited locally.

Pneumatic sensors have the drawback of requiring the assembly of mobile parts and of therefore being complicated and costly to manufacture.

Detectors with a negative thermal coefficient resistor (NTC cable in the terminology generally used) are also known.

Such sensors essentially provide detection of local overheating.

They are mono-criterion sensors and not very robust in situations of failure.

As for the invention, it proposes a detection system with which the drawbacks of the aforementioned detectors may be overcome.

As for it, it proposes a sensor which allows real-time acquisition of several pieces of information on overheating.

With the sensor, it is notably possible to quantify in real time, general overheating and local overheating, and this by exclusively using the electrical properties of the materials making up the sensor.

The structure of this sensor further has the advantage of being of a high reliability.

More specifically, the sensor proposed by the invention is an overheat detection sensor characterized in that it includes a conductive core extending inside a first sheath, also conductive, said core and said first sheath being separated by a material having a positive or negative temperature coefficient, said detector further including a wire made from a material having a positive or negative temperature coefficient, which extends around the first sheath and is separated from the latter by an insulating material, the central core, the first sheath and the wire being connected to connection means.

In an advantageous embodiment, the wire which extends around the first sheath is a wire which is wound on the latter.

Also, the material which separates the core from the first sheath is a material with a negative temperature coefficient, the wound wire being in a material with a positive temperature coefficient.

Other features and advantages of the invention will further emerge from the following description, which is illustrative and non-limiting and should be read through with reference to the appended figures wherein:

FIG. 1 is a schematic perspective illustration of a sensor according to one embodiment of the invention;

FIG. 2 is a schematic perspective illustration of a detail of the sensor of FIG. 1;

FIG. 3 is a schematic sectional illustration of the sensor of FIGS. 1 and 2;

FIGS. 4.a and 4.b are schematic illustrations of details from the illustration of FIG. 3;

FIG. 5 is a schematic illustration of the sensor of the previous figures and of connection means which are associated therewith;

FIG. 6 illustrates different steps in the manufacturing of the sensor of the previous figures.

The sensor illustrated in FIGS. 1-5, includes a cylindrical core 1 which extends inside a tubular sheath 2 called "internal" sheath in the following text. This core 1 and this internal sheath 2 are both in a conductive material. They are insulated from each other by semiconducting powder 2b interposed between said core 1 and said sheath 2.

The internal sheath 2 itself is covered with an insulating sheath 3.a, on which a conductive wire 4 is wound.

This conductive wire 4 is separated from an external sheath 6, also in a conductive material, by a second insulating sheath 3.b which is interposed between said wound wire 4 and said external sheath 6.

At the end of the sensor, insulation between the different sheaths is provided by insulating powder.

At the other end of the sensor, the latter includes connector means 10 (FIG. 4.b and FIG. 5) with which the core 1, the internal sheath 2 and the wound wire 4 may be electrically connected to external processing circuits.

These connector means 10 notably include an electrode 8 in contact with the internal sheath 2, an electrode 9b in contact with the core 1, an electrode 9 in contact with the wound wire 3 and a casing of connectors onto which the electrodes 8, 9b and 9 are brazed.

The whole of the casing 11 is filled with high temperature cement 12 guaranteeing electrical insulation of the whole relatively to ground, as well as mechanical support of the connections.

With such a structure, a cable is available on which it is possible to measure the voltage between one end of the core 1 and one end of the internal sheath 2, the voltage between this same end of the core 1 and one end of the wound wire 4, as well as the voltage of the same ends of the wound wire 4 and the internal sheath 2.

Such a cable integrates two functions.

The first one enables it to provide a piece of information on a point hot area.

This piece of information is notably obtained by a structure which is made up of the core 1, the internal sheath 2 and the semiconducting powder 2b with which core 1 is coated.

Advantageously, in a preferential embodiment, the powder 2b used is a powder with heat-sensitive resistance with a negative temperature coefficient, so that the resistance measured between the core and the internal sheath decreases according to a known law $(R=f(T))$.

As the law of variation of resistance for this type of material is generally of the exponential type, heating of the sensor, even in a very localized area, significantly lowers the resistance of the material and therefore is easily detectable.

Alternatively, of course, the powder may be of the positive temperature coefficient type.

Advantageously, the core 1 and the internal sheath 2 are both in nickel.

As an example, the central core 1 has a diameter between 0.15 and 0.3 mm, whereas the sheath 2 has a diameter between 0.8 and 1.4 mm and a thickness between 0.15 and 0.4 mm.

Different types of semi-conducting powder may be used depending on the maximum temperature to be detected.

Notably, for low temperatures (up to 650° C.), MnO powders which have good electrical properties up to 650° C. are used advantageously. This powder further has an electrical resistance which decreases with increasing temperature and allows large changes in resistance.

For higher temperatures, a mixture of MnO and alumina powders is used advantageously. Such a mixture actually allows a good dynamic range of resistance in the range from room temperatures up to above 650° C.

The second function provided by the sensor is that of detecting general overheating of the area in which said sensor is set up. This function is obtained by the winding 4 which makes up a heat-resistive probe.

The wire constituting the winding 4 is for example of Nickel (material having a positive temperature coefficient).

The measured electrical resistance is then the one between said wound wire 4 and the internal sheath 2.

As an example, the nickel wire with a diameter of 0.15 to 0.30 mm is wound with a constant pitch (example: 700 linear mm for 200 mm of finished sensor).

More specifically, the making of the cable is carried out in the following way.

In a first phase, a blank consisting of the internal core 1 extending in a tube intended to make up the sheath 2 (step 12) is filled with semiconducting powder.

The whole is stretched or shrinked to provide homogeneous compacting, and heat-treated if need be (step 14). An NTC cable is thus available.

A braid of insulating ceramic (insulating sheath 3) is assembled on this cable (step 15). Then, the nickel wire is wound onto this insulating sheath 3 with a constant pitch (wrapping operation 16).

An insulating oversheath is then deposited over this wire 4 (step 17). Assembling is performed by brazing strands of a larger size than those used for the insulating sheath 3.

The whole is then assembled in a nickel tube (external sheath 6), and then stretched or shrinked (step 18) in order to make up a compact and robust assembly (step 14).

The sensor is then set to the desired length and connected to its connector (step 19).

For this purpose, it is filled up with glass seals which provide it with a hermetic seal towards the outside, and then it is brazed to the casing and connected.

The sensor which has just been described has the advantage of being able to be installed in areas with high thermal, vibratory, pressure stresses, high contamination, humidity, electromechanical stresses. The electrical module which is associated with it withstands the same environmental conditions.

It will be noted that this sensor has the advantage of being a mechanical structure which gives it a very high flexibility. In addition, as the functions which it performs are electrical (and not pneumatic, hydraulic) functions, the sensor is of high reliability and may be manufactured as a cable with a great length without any risk of loss of information.

The invention claimed is:

1. An overheat detection sensor comprising:
   a first conductive sheath;
   a conductive core extending inside the first conductive sheath, the conductive core and the first conductive sheath being separated from each other by a material with a positive or negative temperature coefficient;
   a wire made from a positive or negative temperature coefficient material, the wire extending around the first conductive sheath and being separated from the first conductive sheath by an insulating material; and
   a connector having the conductive core, the first conductive sheath and the wire connected thereto.

2. The sensor according to claim 1, wherein the wire is wound around the first conductive sheath.

3. The sensor according to claim 1, wherein the material which separates the conductive core and the first conductive sheath is a negative temperature coefficient material and the wire is formed from a positive temperature coefficient material.

4. The sensor according to claim 2, wherein the core, the first sheath and the wire are formed from nickel.

5. The sensor according to claim 1, wherein the material separating the first conductive sheath and the conductive core is MnO powder.

6. The sensor according to claim 1, wherein the material separating the conductive core from the first conductive sheath is a powder formed from a mixture of MnO and alumina ($A_2O_3$).

7. The sensor according to claim 1, wherein the insulating material interposed between the wire and the first conductive sheath is a braid formed of a ceramic material assembled on the latter.

8. The sensor according to claim 1, wherein the conductive core, the first conductive sheath, and the wire are positioned in a stretched or shrinked tube.

9. The sensor according to claim 8, wherein the tube is formed from nickel.

10. The sensor according to claim 9, wherein the tube is separated from the wire by an insulating ceramic braid.

11. The sensor according to claim 1 wherein the connector includes a connection casing located at one end of the sensor which is filled with high temperature cement.

\* \* \* \* \*

UNITED STATES PATENT AND TRADEMARK OFFICE
CERTIFICATE OF CORRECTION

PATENT NO.         : 7,365,631 B2
APPLICATION NO.    : 10/548209
DATED              : April 29, 2008
INVENTOR(S)        : Hervé Chaumeau and Bruno Lhuillier It is certified that error appears in the above-identified patent and that said Letters Patent is hereby corrected as shown below:

Column 4, line 35, "($A_2O_3$)" should read --$Al_2O_3$--.

Signed and Sealed this

Fourth Day of August, 2009

JOHN DOLL
*Acting Director of the United States Patent and Trademark Office*